July 7, 1970 L. A. KAMENTSKY 3,519,830

METHOD AND MEANS FOR MAINTAINING THE RESOLUTION OF A SCANNING SYSTEM HAVING AN UNDEFINED OBJECT PLANE

Filed Jan. 17, 1966 3 Sheets-Sheet 1

INVENTOR.
LOUIS A. KAMENTSKY

BY

Thomas J. Kilganon Jr.

ATTORNEY 3,519,830

METHOD AND MEANS FOR MAINTAINING THE RESOLUTION OF A SCANNING SYSTEM HAVING AN UNDEFINED OBJECT PLANE

Louis A. Kamentsky, Briarcliff Manor, N.Y., assignor to International Business Machines Corporation, Armonk, N.Y., a corporation of New York Filed Jan. 17, 1966, Ser. No. 521,164
Int. Cl. G02f *1/28*
U.S. Cl. 250—217 21 Claims

ABSTRACT OF THE DISCLOSURE

A method and apparatus are disclosed which maintain the resolving power of a scanning system even though information on an information bearing medium lies in a plurality of focal planes. The interaction between a scanned reading spot of variable focal length and information on an information bearing medium provides electrical signals which relate to the maximum resolution of the optical system regardless of the focal plane in which the information being sought is disposed. Wrinkled documents or transparent media containing information at different levels within the transparent medium are examples of information bearing media wherein the information desired resides in a plurality of focal planes. Using the method and apparatus of the present invention, ambiguous readings are eliminated and the system provides output signals representative of the maximum resolution of the system.

Figure 1A:
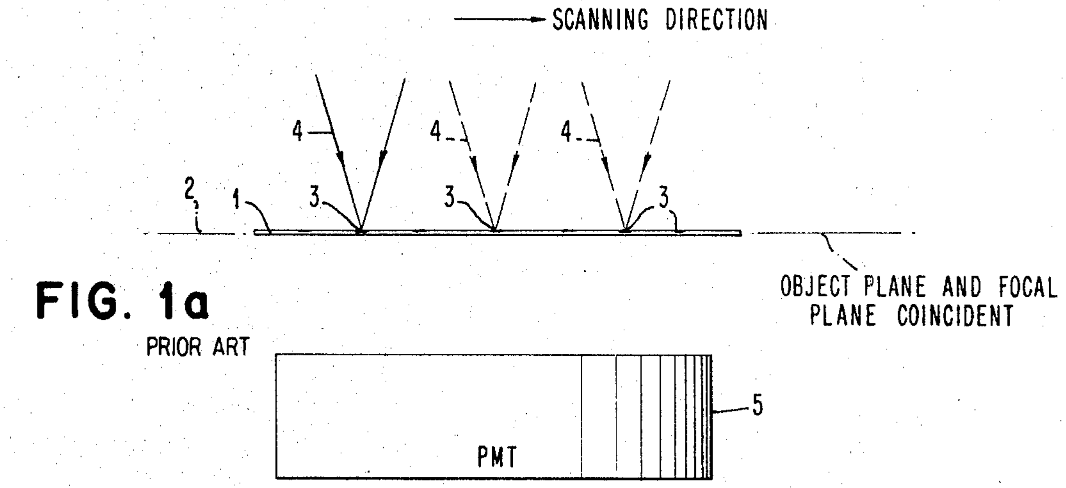

One of the major problems in the optical scanning art is the processing of record media or information bearing elements which cannot be accurately positioned with respect to the optical system or are crinkled or warped due to mishandling or accidental injury. When such information media are detected, they are usually culled from a batch of material which is being processed so that they can be interpreted by hand. A large frequency of misinterpretation by machine devices arises from the wrinkled or crinkled condition in which the information medium arrives at a processing station. Machine errors result from the fact that warping, wrinkling or inability to accurately postion degrades the maximum resolution built into the system because the effect is to change the predetermined focal plane (the focal plane and object plane are usually the same in optical systems which provide high resolution) at which reading must be carried out. Since the maximum resolution is determined by the spot size, in optical scanning arrangements, it should be apparent that any change from the predetermined focal plane will have the effect of changing the spot size to such a degree that the resolution of the system is affected. Imperfections which affect the resolution of a system may not be apparent from a casual observation of the information medium and erroneous information is often recorded and maintained within a data processing system resulting in a great waste of time and money in tracking down the source of such errors. Problems of the nature just described arise most often with information media such as checks and the like which must pass through many hands before final processing can be undertaken. Other information media, such as photographs, which contain information lying in a plurality of focal planes because of warping must often be processed to resolve details which are beyond the capability of fixed focused systems presently in use. Problems of a similar nature also arise where the information being sought lies naturally in a number of focal planes and it is desired to resolve areas of contrast of the same size in each focal plane. An example of this type of information media would be a microscope slide having cellular bodies stacked one upon the other.

For one reason or another, most optical scanning systems use information media which are positioned on the object plane which is also the focal plane of the optical system being utilized. Even where the parameters of the system and geometry considerations indicate that a curved focal plane should be utilized to maintain a constant focus and consequently the same maximum resolution as a spot is scanned across an information medium, it appears to be preferable to vary the focus of the system by rather complex mechanical devices which change the focus of the optics in a fixed manner as a spot scanned across the information medium. As may be imagined, such systems are relatively complex and expensive and are relatively limited in the size of information medium which can be processed. Further, the resolving capability of such fixed geometry arrangements may be affected by environmental conditions such as temperature, humidity and the like. It would appear therefore that a need exists for a simply constructed, versatile optical system which is capable of maintaining a desired resolution even though the focal plane of the information medium is undefined.

It is therefore, an object of the invention to provide a method and apparatus which maintains a constant resolution of an optical scanning system despite the fact that information being read does not lie within a single focal plane.

Another object is to provide a method and apparatus which involves the utilization of a scanning beam whose focal plane is cyclically varied as the beam scans across an information bearing medium. In this manner, regardless of the focal plane within which the information lies, a signal indicative of optimum resolution is obtainable.

Still another object is to provide an apparatus and method for reading information which lies within a plurality of focal planes which is simpler, more versatile, and less expensive than prior art methods and apparatus.

Still another object is to provide an optical scanning method and apparatus which permits the sensing of information from an information medium which lies within a plurality of focal planes.

Yet another object is to provide a method and apparatus for maintaining the maximum resolution of an optical scanning system despite the fact that the contrast between the background and the areas of contrast is minimal.

The foregoing and other objects, features, and advantages of the invention will be apparent from the following more particular description of a preferred embodiment of the invention, as illustrated in the accompanying drawings.

In the drawings:

FIG. 1*a* is a cross-sectional representation of a prior art optical scanning technique in which the object plane and the focal plane of an information medium are coincident.

Figure 1B:
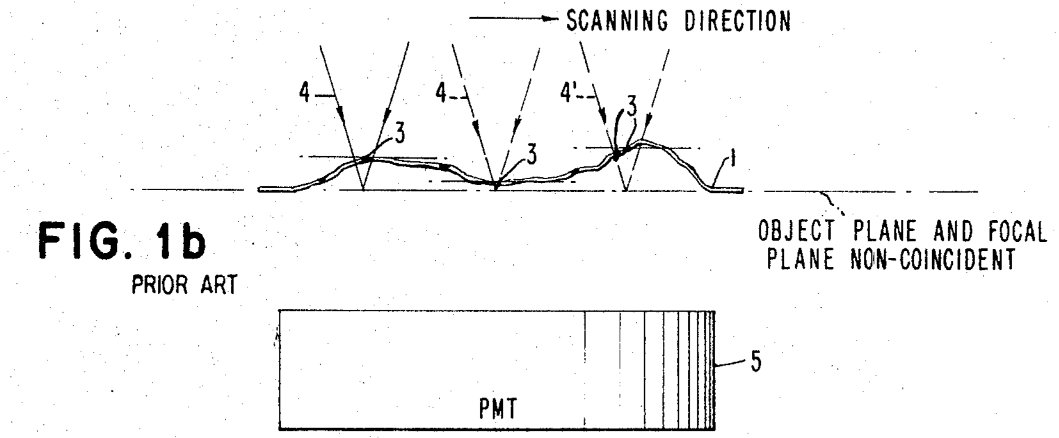

FIG. 1*b* is a cross-sectional representation of an information medium in wrinkled condition being scanned by a fixed focus prior art optical scanning system to detect areas of contrast thereon. In this regime, the object plane of the medium and the focal plane of the areas of contrast are non-coincident.

Figure 1C:
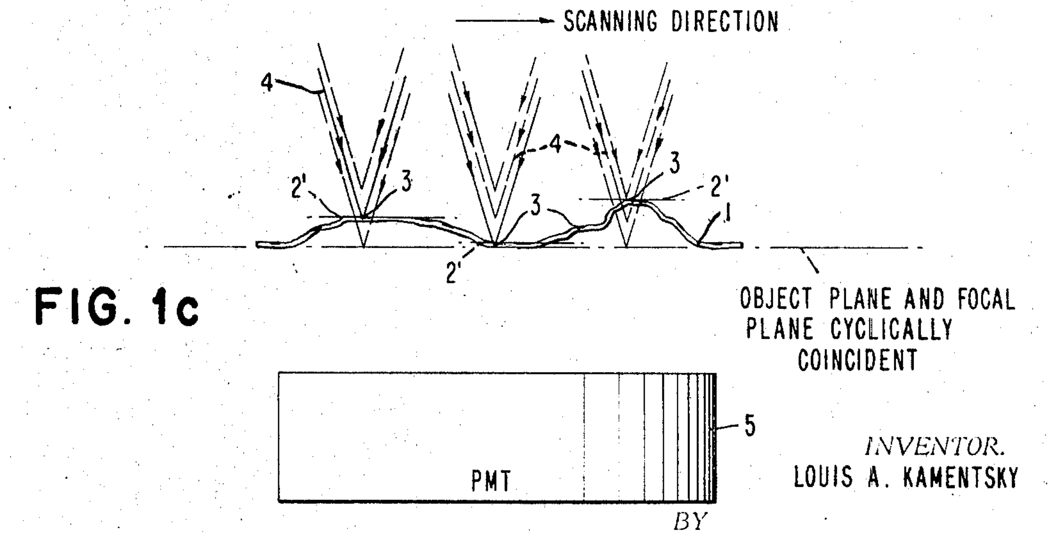

FIG. 1*c* is a cross-sectional representation of an information medium in wrinkled condition being scanned by a cyclically variable spot of radiant energy in accordance with the present invention to detect areas of contrast. In this regime, the object plane of the medium and the focal plane of the areas of contrast are cyclically coincident.

Figure 2A:
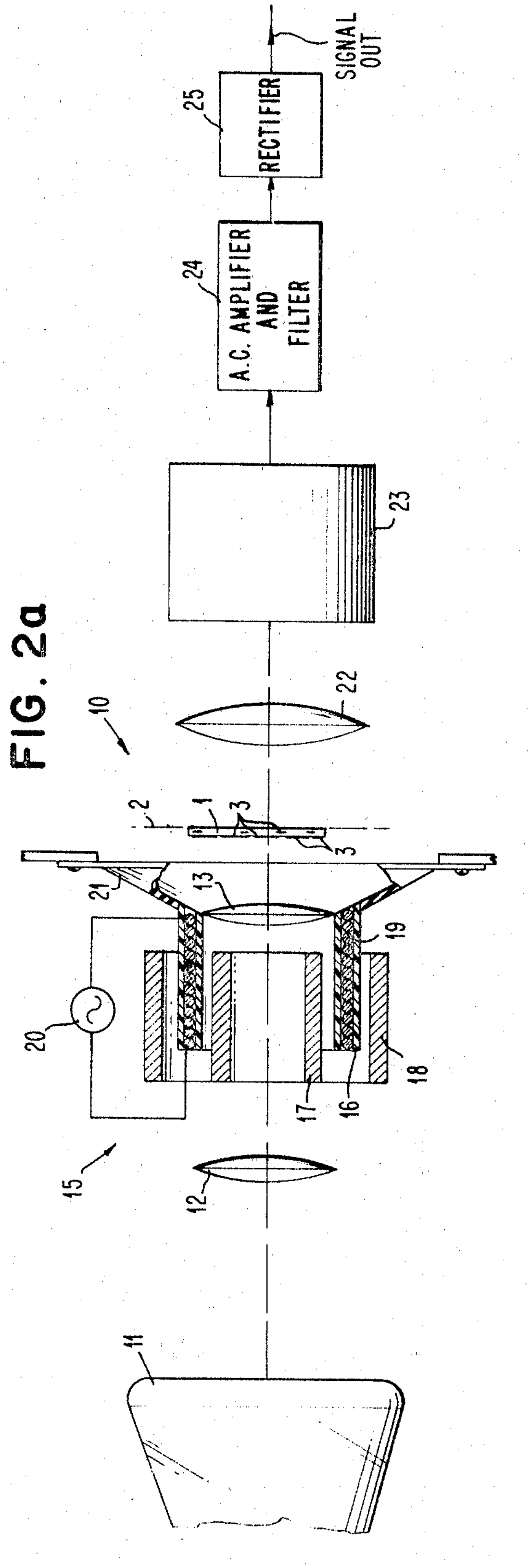

FIG. 2*a* is a partial schematic block diagram of an optical system used in practicing the method of this invention showing a vibratory arrangement for cyclically varying the focus of the system from the object plane.

Figure 2B:
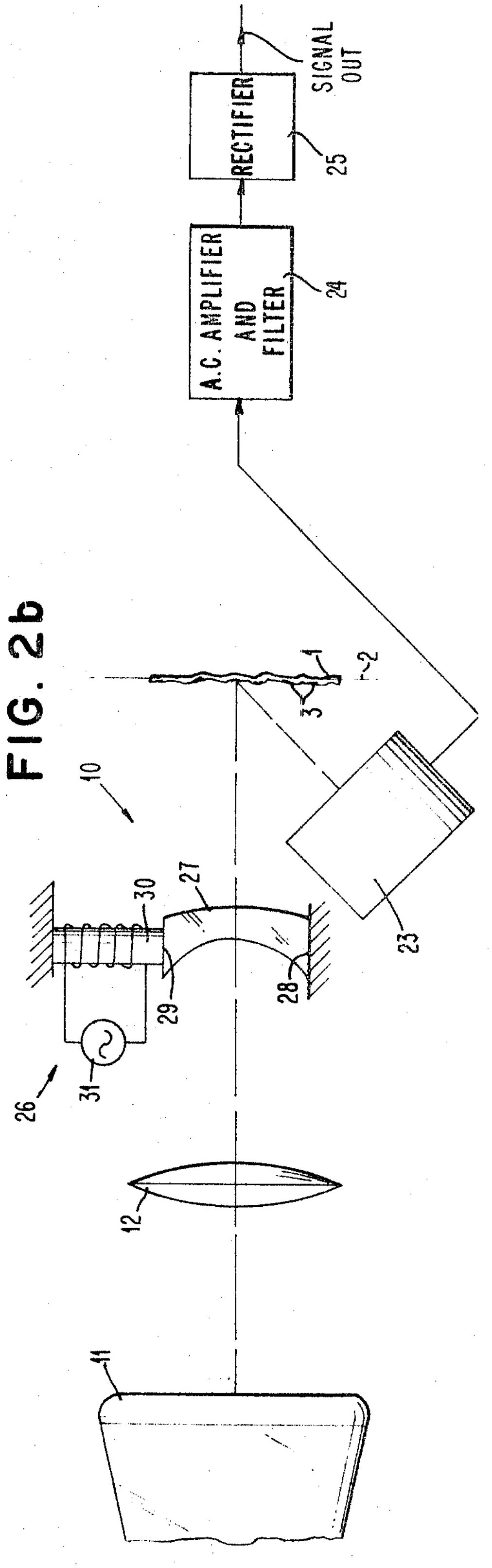

FIG. 2*b* is a partial schematic block diagram of an optical system showing a flexing arrangement for cyclically varying the focus of the system from the object plane. In this arrangement, reflected light from an opaque information medium is used to detect areas of contrast.

Figures 2C, 3A, 3B, 3C, 3D:
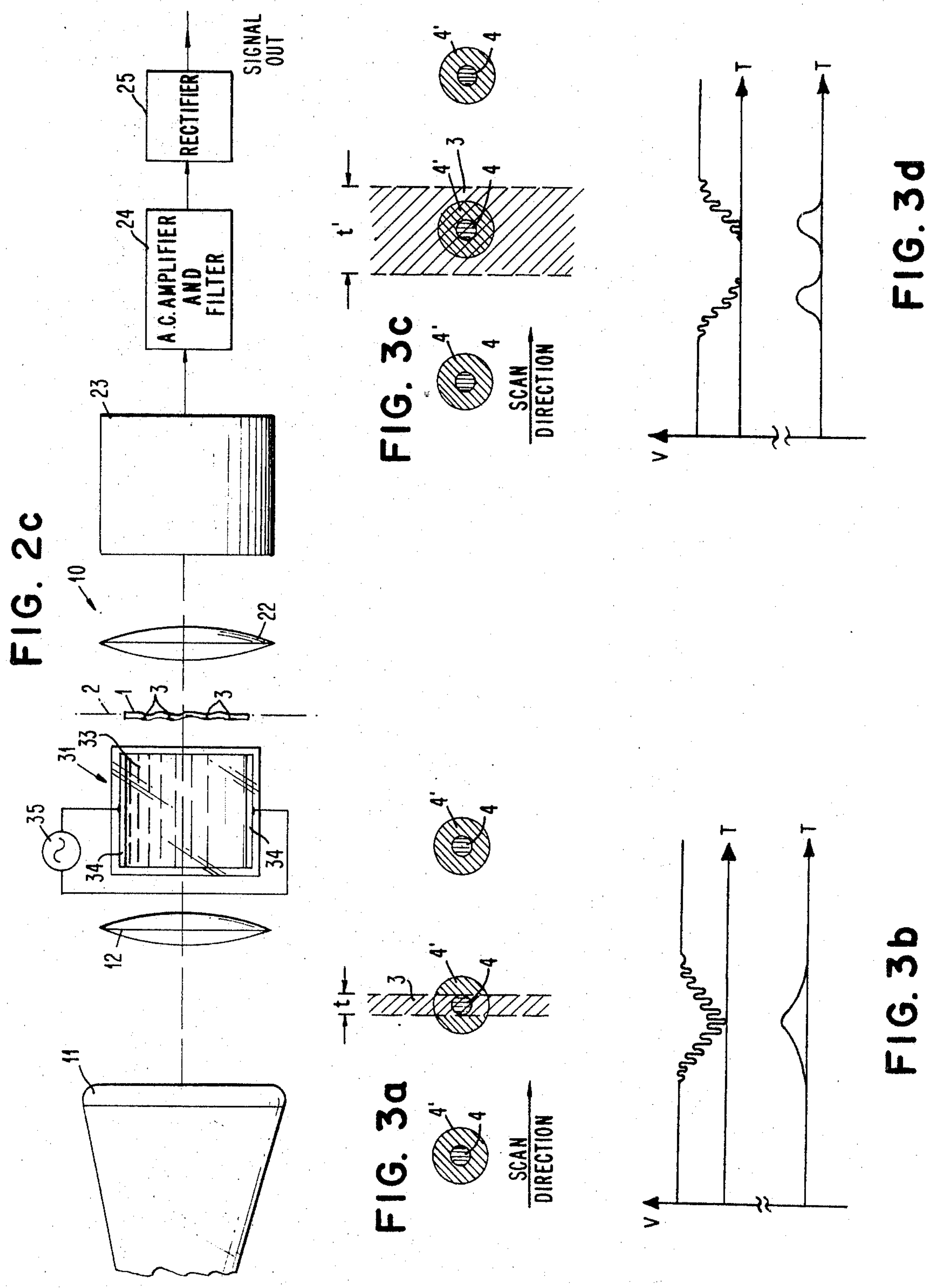

FIG. 2*c* is a partial schematic block diagram of an optical system showing a variable index of refraction device such as a Kerr cell for cyclically varying the focus of the system from the object plane.

FIG. 3*a* is an illustration of a light spot of varying size intercepting an area of contrast which is smaller than the maximum spot size.

FIG. 3*b* is a graphical representation of the signal obtained from a photomultiplier tube under the conditions of FIG. 3*a*. The filtered and rectified signal is also shown.

FIG. 3*c* is an illustration of a light spot of varying size intercepting an area of contrast which is larger than the maximum spot size.

FIG. 3*d* is a graphical representation of the signal obtained from a photomultiplier tube under conditions of FIG. 3*c*. The filtered and rectified signal is also shown.

In accordance with this invention, a method and apparatus are provided which permit the maintainance of maximum optical resolution of an optical scanning system despite the fact that the information being read lie in a plurality of focal planes. The maximum optical resolution of the system is maintained by applying a cyclic variation to a reading spot of radiant energy which causes the focal plane of the spot to be varied at the same cyclic rate. Since the maximum resolution attainable in any optical system is dependent on the size of the reading spot, it should be clear that a cyclic variation of the focal plane provides a minimum spot size and hence maximum resolution on different focal planes during each cyclic variation. If information being sought lies within a plurality of focal planes as it does with wrinkled or warped information media, the cyclic variation of minimum spot size within these focal planes permits the reading of information without degradation of system resolution. While this may be said to be tentamount to varying the focus of a microscope by hand, it should be appreciated that in opposition to the usual technique of changing the focus until the object is in focus and then stopping to view the object, the technique of the present invention provides for continuously and cyclically varying the focus and providing an output signal which is indicative of the maximum system resolution regardless of the focal plane being scanned. To accomplish the foregoing, a flying spot of light of given size is provided by a cathode ray tube or other suitable source which scans the spot in raster fashion across the face of the cathode ray tube. An optical system, well known to those skilled in the art of optics, focuses the spot on to an object plane which is also the focal plane of the system. A Kerr cell or other suitable device is interposed in the light path such that upon application of an appropriate electrical signal to the cell, the index of refraction of the cell is changed thereby changing the focus of the light spot from the object plane to points above and/or below the object plane. Because the focus is cyclically varying at a much higher rate than the spot sweeps across the cathode ray tube, a given focal plane on an information medium is subjected to what appears to be a light spot of varying size. The information medium, in the usual case, contains areas of contrast which are indicative of information desired and, to attain high information density, are usually small in size and packed rather closely. Thus, it is a rather simple matter where the information medium becomes warped or wrinkled to affect the resolution of a fixed focus system because the effect of warping is to increase the spot size and therefore decrease the resolution of the system. The present system avoids degradation of resolution by cyclically varying the focus such that signals having a variation rate equal to the variation rate of the focus are generated from a photomultiplier tube which relate to minimum size areas of contrast on a plurality of focal planes. Using the present invention, it is also possible to differentiate between broad and narrow areas of contrast. Thus, a signal having an A.C. component is generated as the scanning spot encounters an area of contrast. In an instance where an area of contrast is narrower than the diameter of an unfocused spot, a continuous A.C. signal is generated as the spot scans across the area. In the instance of an area of contrast which is much broader than the diameter of the unfocused spot, an A.C. burst is generated when the spot encounters the area and a second A.C. burst is generated when the spot leaves the area. The resulting signals may be amplified in an A.C. amplifier and then rectified to provide signals useful in binary storage devices or they may be fed to photoprocessing devices where signals indicative of a given resolution are printed-out; all other signals having been eliminated to provide a photograph uncluttered with undesired details.

Using the technique of the present invention, another advantage accrues to the user in that the present system is not dependent on sharp definition between the background and the areas of contrast being read. Thus, areas of low contrast can be detected with ease using the variable focus system of the present invention because the output signal contains an alternating current component only when the scanning spot is intermittently blocked as it approaches an area of contrast which is at least capable of partially blocking the spot when it is of minimum size. The change in transmitted or reflected light intensity will perhaps be quite small due to a small change in contrast, but in any event, an output signal containing an alternating component will result regardless of the small difference in contrast between the background and the area being scanned.

Referring now to FIG. 1*a*, there is shown a representation of a prior art optical scanning technique in which the object plane and the focal plane are coincident. An information medium 1 is shown disposed on the focal plane of an optical system. The focal plane is represented by dotted line 2. Areas of contrast 3 are shown on the surface of medium 1. A beam of light 4 focused so that the object plane and focal plane are coincident is scanned across medium 1 and each time an area of contrast 3 is encountered the signal at photomultiplier tube 5 is changed and a signal amenable to further processing is obtained. In such systems, there is no way of changing the focal plane of focused spot 4 when information medium 1 becomes wrinkled or warped such as shown in FIG. 1*b*.

A consideration of FIG. 1*b* clearly shows the deleterious effects which may be expected when, in effect, the focal planes of the information being sought lie in a plurality of planes different from the object plane. When an area of contrast 3 on wrinkled medium 1 is illuminated by a fixed focus spot 4, the size of the spot is much larger than if the area of contrast were in the object plane. As a result, photomultiplier 5 may not detect any significant change in illumination if the spot size is significantly larger than area 3. An even more deleterious condition arises when the spot size is so large that it encompasses more than one area of contrast. This condition is shown at the right hand side of FIG. 1*b* where light beam 4' is shown illuminating two areas of contrast 3. Under such circumstances, the illumination may not be significantly changed to provide an output from photomultiplier 5 or, if an output is provided, it will be detected as only a single area of contrast and an erroneous output results. The overall effect on an optical system is a degradation of the maximum resolution built into the system.

FIG. 1*c* shows the technique of the present invention which eliminates the possibility of erroneous outputs and in which the maximum resolution of the system is maintained despite the fact that the information being sought lies in a plurality of focal planes. In FIG. 1*c*, the object plane and the focal plane are cyclically coincident. This is accomplished by cyclically changing the focus so that object plane and the focal plane 2 coincide with areas of contrast 3 on wrinkled information medium 1. Light beam 4 is shown in FIG. 1*c* having a plurality of focal planes one of which intersects an area of contrast 3 at planes 2' as the focus of beam 4 is cyclically varied at a high rate relative to the rate at which it is scanned across medium 1. From FIG. 1*c*, it can be seen that if the focus is cyclically varied, a light spot of minimum size will dwell at some instant on areas of contrast 3 resulting in a signal having the resolution of the fixed focus technique described in connection with FIG. 1*a*. The details of the system and the means for maintaining the resolution of the system substantially constant will be discussed below. From the foregoing, it should be clear that using a cyclically varying focus provides an output signal which relates to the maximum resolution of the system because each area of contrast regardless of its focal plane is illuminated at some time during the scanning with a light beam of minimum size.

Referring now to FIG. 2*a*, there is shown a partial block diagram of an optical system which incorporates a vibratory arrangement to provide a substantially constant system resolution even though information sought to be read lies on a plurality of focal planes.

Optical system 10 utilizes a cathode ray tube as a source 11 of radiant energy. The cathode ray tube is controlled by electronic circuitry (not shown) well known to those skilled in the electronic art to provide a raster-type scan on the face of the cathode ray tube. This arrangement is utilized in well-known flying-spot scanner systems. In such systems, a spot of desired size, electronically focused, is swept back and forth across the face of the cathode ray tube. An objective lens 12 images the spot of radiant energy on focal plane 2 in conjunction with lens 13. Since focal plane 2 and the object plane are intended to be at least cyclically coincident in the practice of this invention, both the focal plane and the object plane will be characterized hereinafter as the focal plane. Associated with lens 13 is a transducer which interacts with radiant energy from source 11 to cyclically vary the focus of the radiant energy from focal plane 2 through a plurality of focal planes in the manner of FIG. 1*c*. As in FIG. 1*c*, information medium 1 is disposed such that areas of contrast 3 representing information to be read lie in a plurality of focal planes due to the warped or wrinkled condition of medium 1. The transducer in FIG. 2*a*, consists of vibratory means 15 which applies a rectilinear component of motion to lens 13 such that the focus of system 10 is cyclically varied from focal plane 2.

Lens 13 is shown in FIG. 2*a* fixedly connected to a coil form 16. Coil form 16 is disposed between inner and outer annular magnets 17, 18, respectively, and is immersed in the magnetic field extending radially across the gap between magnets 17, 18. A conductive coil 19 is fixedly held to form 16 and the extremities of coil 19 are connected to a source of alternating current 20. Coil form 16 is held in position between magnets 17, 18 by a spider or flexible diaphragm 21, the ends of which are fixed.

In operation, vibratory means 15 is energized from A.C. source 20 at a frequency much greater than the frequency at which the spot from source 11 is scanned across the face of the cathode ray tube. The varying current in coil 19 in the presence of the magnetic field from magnets 17, 18 causes coil 19 to move rectilinearly thereby simultaneously translating both coil form 16 and lens 13. In this manner, the focus of system 10 is cyclically varied from focal plane 2 and an area of contrast 3 regardless of its focal plane is scanned by a spot of minimum size. A condenser lens 22 images the spot onto a photomultiplier tube 23 which is of a suitable type well known to those skilled in the electronics art. Photomultiplier 23 provides a signal which contains an alternating current component to alternating current amplifier and filter 24 which amplifies the signal. The filter included is tuned to the vibration frequency of source 20 so that all extraneous noise in the system is removed. The output signal of amplifier 24 is applied to rectifier 25 and an output signal having only a direct current level is provided. As will be discussed in detail in connection with FIGS. 3*a*–3*d*, the alternating current component arises as a result of the interaction between an area of contrast in a given focal plane and what appears to be a light spot of varying size in that given focal plane. As will also be seen, the width of an area of contrast relative to the maximum size of the light spot also affects the output signal.

The resulting signals from rectifier 25 are suitable for use in a data processing system and, as suggested hereinabove, may be fed to a pulse selector system so that certain pulses may be eliminated to provide only information having a desired resolution. Applications of this technique can be used in connection with photographs where it is desired to eliminate undesired details.

Referring now to FIG. 2*b*, there is shown a system 10 similar in all respects to that shown in FIG. 2*a* with the exception that a flexing arrangement 26 has been substituted for the vibratory means 15 and photomultiplier tube 23 is shown disposed at an angle relative to the focal plane 2 to be responsive to reflected light from an opaque document. In the arrangement of FIG. 2*b*, a double convex lens 27 suitable for focusing radiant energy on focal plane 2 is shown having an edge 28 thereof fixed so that it is immovable. Edge 29 of lens 27 has a cylindrical slug 30 of magneto-strictive material fixedly attached to it by a suitable adhesive. Lens 27 is made of plastic such as Lucite or other transparent material suitable for flexing. The upper extremity of slug 30 is also fixed so that the lengthening and contracting of the magneto-strictive material under the influence of current from A.C. source 31 affects only lens 27. The flexing of lens 27 changes the radius of curvature of the faces of lens 27 in cyclic fashion resulting in a cyclically varying focus from focal plane 2. In this manner, as with the arrangement of FIG. 2*a*, information media which are bent, warped or wrinkled, may be correctly interpreted. Using reflected light to obtain signal outputs permits the reading of opaque documents and also permits information to be read from larger size documents.

Referring now the FIG. 2*c*, there is shown an optical system 10 similar in all respects to that shown in FIG. 2*a* with the exception that a variable index of refraction device 31 such as a Kerr cell has been substituted for vibratory means 15. Device 31 consists of a transparent container 32 containing a fluid 33 such as nitrobenzene, the index of refraction of which varies under the influence of an applied electric field. The required electric field is supplied across electrodes 34, by applying a signal from alternating current source 35. As the index of refraction is cyclically varied in response to the varying electric field, the focus of system 10 is cyclically varied from focal plane 2 such that areas of contrast 3 in other focal planes are irradiated with a spot of minimum size, thereby maintaining the resolution of the system substantially unchanged. One useful application of the system of FIG. 2*c* is the reading of microfilms which are often subject to warping due to temperature and humidity factors. The present system takes into account all variations from a given focal plane and provides useful outputs regardless of the condition of the microfilm.

In FIG. 3*a* there is shown an area of contrast 3 which has a thickness *t* which is less than the maximum size 4' of focused spot 4. If the area 3 lies on a given focal plane, the effect of cyclically varying the focus of an optical system 10 is to vary the size of spot 4 from its minimum size to its maximum size 4'. It should be appreciated that at any instant the size of spot 4 may be any size between the maximum and minimum size of spot 4 in view of the cyclic nature of the variation applied to transducers 14. Thus, as spot 4' begins to intercept area 4, the light to a sensor will be partially blocked and an output signal variation will result. Since the focus is varying at a higher rate than area 4 in being scanned, spot 4' can be reduced to minimum size so that it no longer blocks the light causing the output signal to return to its original level. As the intermittently focused spot sweeps across area 3, a signal having an alternating component is produced, because light is never totally blocked unless the width of spot 4 at its minimum is equal to or less than area thickness $t$. The resulting signal from the A.C. amplifier 24 of system 10 is shown in FIG. 3*b* along with the rectified output signal from rectifier 25.

In FIG. 3*c*, an area of contrast 3 having a thickness $t'$ which is greater than the maximum size 4' of focused spot 4 is shown. An inspection of FIGS. 3*c* to 3*d*, shows that the output of A.C. amplifier 24 drops to a minimum during that portion of the scan when varying spot 4 is completely blocked by area 3. It is under the conditions of FIG. 3*c*, that it can be most clearly seen that the variable focus spot produces no output until it interacts with an area of contrast 3. Thus, it is seen that an output results going from a light-to-dark area and going from a dark-light area. In the instance of FIG. 3*a* using the cyclically varying focus, the resolution of the system is maintained. If the spot size were significantly larger than area 3 in FIG. 3*a*, the change in illumination with a fixed focus spot might not be detectable. In the instance of FIG. 3*c*, resolution is not a factor, but it is significant that a useful output is provided even though the reading spot is completely blocked at some time during the scan.

It should be appreciated that although this invention has been discussed primarily in conjunction with wrinkled or warped information media that the information medium itself need not be wrinkled but may have a substantial thickness with information being disposed therein in a plurality of focal planes. For instance, a plurality of films having areas of contrast thereon could be stacked to form an optically read, three dimensional, read-only memory. By varying the focal plane in accordance with the present invention, information on any focal plane can be provided.

While the invention has been particularly shown and described with reference to preferred embodiments thereof, it will be understood by those skilled in the art that various changes in form and details may be made without departing from the spirit and scope of the invention.

What is claimed is:

1. Apparatus for maintaining the resolving power of an optical system wherein information being sought lies within a plurality of focal planes comprising in combination an information bearing medium wherein the information being sought is distributed in a plurality of focal planes means for generating a reading spot of radiant energy projected along a given path which provides a given resolution at a given focal plane and means coacting with said radiant energy for cyclically varying the size of said spot at said given focal plane to provide said given resolution in said plurality of focal planes.

2. Apparatus according to claim 1 further including means for scanning said reading spot raster-fashion across said information bearing medium.

3. Apparatus according to claim 1 further including means for detecting variations in illumination resulting from the cyclic interaction of said spot with said information and means connected to said detection means for rectifying said variations.

4. Apparatus according to claim 1 wherein said means for generating a reading spot includes a source of radiant energy and optical means coacting with said source for producing a spot of minimum size in said given focal plane.

5. Apparatus according to claim 1 wherein said means for cyclically varying the size of said spot includes transducer means interacting with said radiant energy to cyclically vary the focus of said radiant energy from said given focal plane through said plurality of focal planes.

6. Apparatus according to claim 5 wherein said transducer means includes an optical element interposed in said given path and vibratory means coupled to said optical element for applying rectilinear component of motion along said given path to cyclically vary said focus from said given focal plane.

7. Apparatus according to claim 5 wherein said transducer means includes an optical element interposed in said given path and flexing means coupled to said optical element for flexing said optical element to cyclically vary said focus from said given focal plane.

8. Apparatus according to claim 5 wherein said transducer means includes an electrically variable index of refraction element interposed in said given path to cyclically vary said focus from said given focal plane.

9. Apparatus according to claim 6 wherein said vibratory means includes means for generating a fixed magnetic field, a conductive coil fixedly connected to said optical element, said coil and said element being resiliently mounted and immersed within said magnetic field and a source of alternating current connected to said coil to apply a rectilinear component of motion to said coil and said element.

10. Apparatus according to claim 7 wherein said flexing means includes a magnetostrictive device fixedly connected to an edge of said optical element an opposite edge of said element being restrained, a conductive coil surrounding said member and a source of alternating current connected to said coil to vibrate said magnetostrictive element such that said optical element is flexed.

11. Apparatus according to claim 8 wherein said electrically variable index of refraction element includes a Kerr cell.

12. Apparatus according to claim 2 wherein said means for scanning includes a cathode ray tube.

13. Apparatus according to claim 3 wherein said means for detecting variations includes a photomultiplier.

14. Apparatus according to claim 4 wherein said optical means includes an objective lens interposed in said given path.

15. Apparatus for maintaining the maximum resolution of an optical system wherein the focal plane of the system is undefined comprising information means containing at least an area of contrast in a plurality of focal planes, means for projecting a spot of radiant energy at said information means along a given path, means interacting with said radiant energy to vary the size of said spot in a given focal plane and means for applying relative motion between said spot and said areas of contrast, said spot and said areas interacting to block varying amounts of said radiant energy as said spot intermittently intercepts said areas.

16. Apparatus for maintaining the optimum resolution of an optical system comprising information means having a thickness which lies within a plurality of focal planes and having at least an area of contrast on a plurality of said focal planes, means for projecting a spot of radiant energy at said information means, means for applying relative motion between said spot and said information means and means for cyclically varying the focal plane of said spot such that said areas are irradiated with at least a spot of minimum size.

17. A method for maintaining the optimum resolution of an optical system comprising the steps of providing an information medium having a thickness which lies within a plurality of focal planes and having at least an area of contrast on a plurality of said focal planes, projecting a spot of radiant energy at said information means, and cyclically varying the focal plane of said spot such that said areas are irradiated with at least a spot of minimum size.

18. A method according to claim 17 further including the step of simultaneously scanning said spot in the region of said areas of contrast to intermittently intercept at least portions of said radiant energy.

19. A method for maintaining the maximum resolution of an optical system wherein the focal plane of the system is undefined comprising the steps of providing an information medium containing at least an area of contrast in a plurality of focal planes, projecting a spot of radiant energy at said information medium along a given path, cyclically varying the size of said spot in each of said focal planes, applying relative motion between said cyclically varying spot and said areas of contrast to block varying amounts of radiant energy as said spot intermittently intercepts said areas.

20. A method for maintaining the maximum resolution of an optical character reading system using a flying spot scanner comprising the steps of providing an information medium in which characters to be read are disposed in a plurality of focal planes, cyclically modulating the focus of said flying spot at a rate greater than the scanning rate of said system such that the spot size in a given focal plane varies from a size proportional to the maximum resolution of the system to a size greater than said first mentioned size to provide cyclically varying output signals indicative of encounters with said characters.

21. A method according to claim 20 further including the steps of amplifying said output signals, rectifying said amplified signals, and selecting certain of said output signals for application to a display means wherein characters of a selected resolution are displayed.

References Cited

UNITED STATES PATENTS

| | | | |
|---|---|---|---|
| 1,648,058 | 11/1927 | Parker | 250—235 |
| 2,863,064 | 12/1958 | Rabinow | 250—235 |
| 2,899,564 | 8/1959 | Rabinow et al. | 250—235 |
| 2,958,080 | 10/1960 | Aiken | 250—235 |
| 3,020,414 | 2/1962 | McKnight et al. | 250—235 |
| 3,037,156 | 5/1962 | Koulikovitch | 250—235 |
| 3,206,608 | 9/1965 | Aulin | 250—235 |
| 3,234,844 | 2/1966 | Fain et al. | 250—235 |
| 3,254,227 | 5/1966 | Hock | 250—235 |
| 3,350,156 | 10/1967 | Adams. | |
| 3,353,027 | 11/1967 | Bliss et al. | 250—235 |
| 3,016,464 | 1/1962 | Bailey | 250—224 X |
| 3,358,184 | 12/1967 | Vitt. | |

OTHER REFERENCES

Zworykin, V. K., Photo-electricity, New York, John Wiley & Sons, 1949, pp. 244–245 relied upon.

RALPH G. NILSON, Primary Examiner

C. M. LEEDON, Assistant Examiner

U.S. Cl. X.R.

250—219, 235